(12) United States Patent
Clark

(10) Patent No.: US 9,683,676 B2
(45) Date of Patent: Jun. 20, 2017

(54) VALVE WITH PROOF OF CLOSURE

(71) Applicant: Derold G Clark, Sylvan Lake, CA (US)

(72) Inventor: Derold G Clark, Sylvan Lake, CA (US)

( * ) Notice: Subject to any disclaimer, the term of this patent is extended or adjusted under 35 U.S.C. 154(b) by 303 days.

(21) Appl. No.: 13/847,605

(22) Filed: Mar. 20, 2013

(65) Prior Publication Data

US 2013/0291968 A1 Nov. 7, 2013

(30) Foreign Application Priority Data

May 7, 2012 (CA) ..................................... 2776514

(51) Int. Cl.
*F16K 37/00* (2006.01)
*F16K 15/06* (2006.01)
*F16K 17/04* (2006.01)

(52) U.S. Cl.
CPC ........ *F16K 37/0008* (2013.01); *F16K 15/063* (2013.01); *F16K 17/044* (2013.01); *Y10T 137/8275* (2015.04)

(58) Field of Classification Search
CPC ............... F16K 31/143; F16K 37/0058; F16K 31/1221; G05D 7/0126; G05D 16/10
USPC .... 251/63.4, 63.6, 77; 137/553, 556, 625.27
See application file for complete search history.

(56) References Cited

U.S. PATENT DOCUMENTS

| | | | | |
|---|---|---|---|---|
| 1,701,284 A * | 2/1929 | Terry | ................. | G05D 16/0619 137/116.5 |
| 2,897,836 A * | 8/1959 | Peters et al. | ................ | 137/454.5 |
| 3,028,878 A * | 4/1962 | Natho | ............................ | 137/556 |
| 3,244,399 A * | 4/1966 | Jones et al. | ................... | 251/327 |
| 3,247,865 A * | 4/1966 | Doyle | .......................... | 137/484.8 |
| 3,326,239 A * | 6/1967 | Saint-Joanis et al. | ... | 137/625.66 |
| 3,572,366 A * | 3/1971 | Wiggins | ......................... | 137/240 |
| 3,880,129 A * | 4/1975 | Hollis, Jr. | .............. | F02M 26/58 123/568.29 |
| 3,889,922 A * | 6/1975 | Peters | ............................ | 251/14 |
| 3,928,966 A * | 12/1975 | Goto | ...................... | F02M 26/55 123/568.28 |
| 4,180,034 A * | 12/1979 | Vogelsberg | ............ | F02M 26/58 123/676 |

(Continued)

OTHER PUBLICATIONS

Canadian Examiner's Report issued in corresponding Canadian Patent Application No. 2,776,514 mailed Jul. 13, 2015.

*Primary Examiner* — Jessica Cahill
*Assistant Examiner* — Angelisa L Hicks
(74) *Attorney, Agent, or Firm* — Davis & Bujold PLLC; Michael J. Bujold

(57) ABSTRACT

A valve with proof of closure includes a valve body with a first port and a second port separated by a valve member that is biased toward a closed position. A piston is mounted within a pressure chamber with a pressure fluid port for connecting to a source of pressurized fluid. Piston is biased toward a retracted position and is moved to an extended position in response to pressurized fluid entering through pressurized fluid port. A control member is attached to valve member and is engaged by piston as it is moved a first distance from retracted position toward extended position. A valve position indicator with a closed state and as open state is biased toward the closed state and is actuated by piston as piston moves a second distance from retracted position toward extended position to move valve position indicator from closed state toward open state.

5 Claims, 3 Drawing Sheets

(56) References Cited

U.S. PATENT DOCUMENTS

| | | | | |
|---|---|---|---|---|
| 4,199,131 A | * | 4/1980 | Boski | E21B 29/04 |
| | | | | 251/291 |
| 6,138,712 A | * | 10/2000 | Hirose | 137/559 |
| 6,481,459 B2 | * | 11/2002 | Fukano et al. | 137/554 |
| 7,004,445 B2 | * | 2/2006 | Lymberopoulos | 251/14 |
| 7,509,972 B2 | * | 3/2009 | Nesbitt | F16K 35/06 |
| | | | | 137/383 |
| 2010/0163765 A1 | | 7/2010 | Gregoire | |

* cited by examiner

DETAIL 1

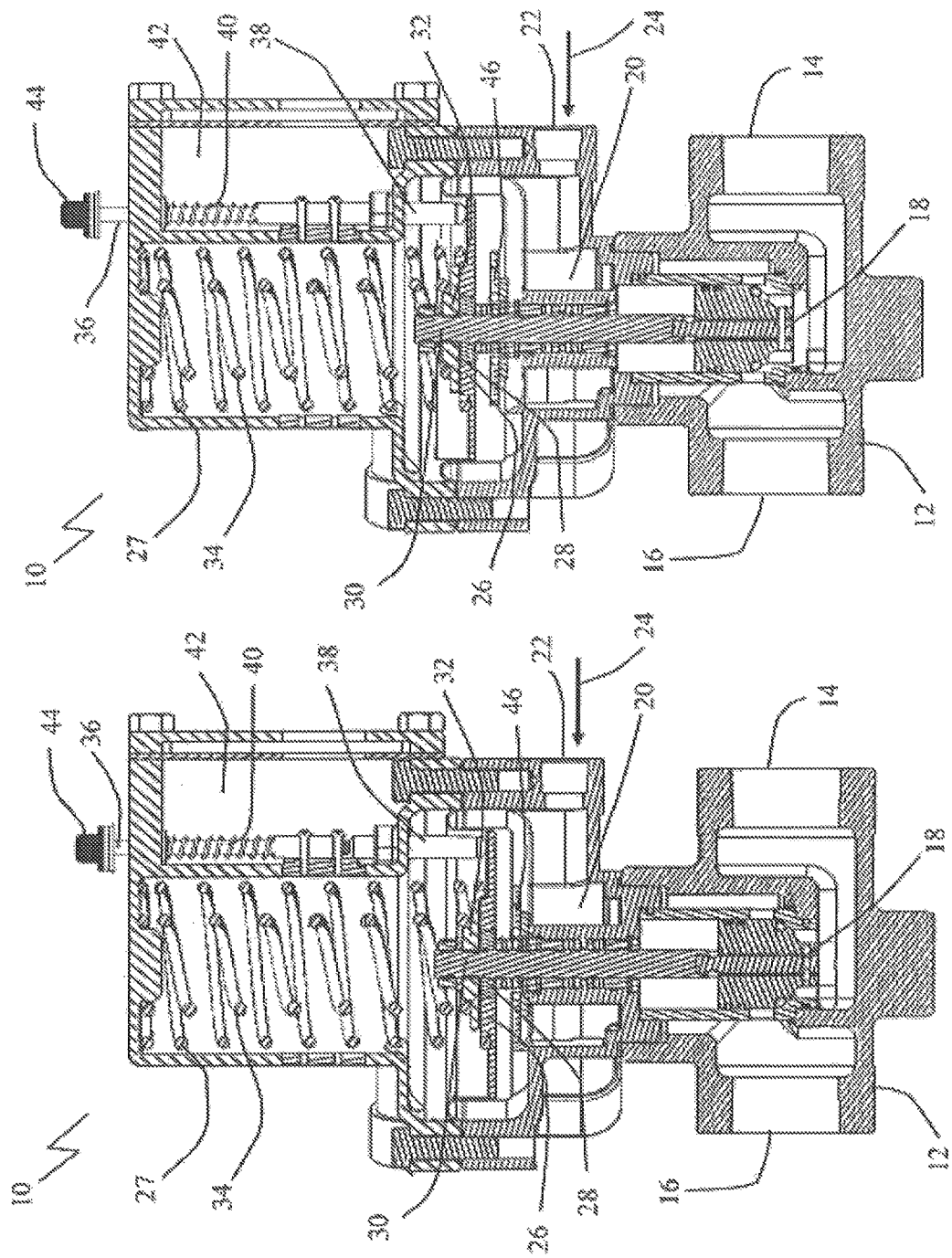

VALVE WITH PROOF OF CLOSURE

FIELD

This relates to a fluid valve that incorporates an indicator providing proof of closure.

BACKGROUND

For safety reasons, it is often necessary to confirm whether a valve is closed.

SUMMARY

There is provided a valve with proof of closure includes a valve body with a first port and a second port separated by a valve member that is biased toward a closed position. The valve has a pressure chamber with a pressurized fluid port for connecting to a source of pressurized fluid. A piston mounted within the pressure chamber biased toward a retracted position and movable to an extended position in response to pressurized fluid entering through the pressurized fluid port. A control member is attached to the valve member. The piston engages the control member as the piston is moved a first distance from the retracted position toward the extended position. A valve position indicator has a closed state and an open state and is biased toward the closed state. The valve position indicator is actuated by the piston as the piston is moved a second distance from the retracted position toward the extended position to move the valve position indictor from the closed state toward the open state. The second distance is less than or equal to the first distance.

According to an aspect, the valve position indicator may have a shaft that moves axially when engaged by the control member.

According to an aspect, the control member may have a first plate attached to the valve member by a shaft and the piston has a second plate mounted between the valve member and the control member.

According to an aspect, each of the control member and the piston may be independently biased toward a retracted position by springs.

According to an aspect, a lower control member may be attached to the valve member and disposed below the piston. The lower control member prevents the piston from returning to the retracted position until the valve member is in the closed position.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 5 is a front elevation view in section of the piston moving toward an extended position with the valve in a closed position.

FIG. 6 is a detailed view in section of the valve in an open position.

DETAILED DESCRIPTION

Figure 1:
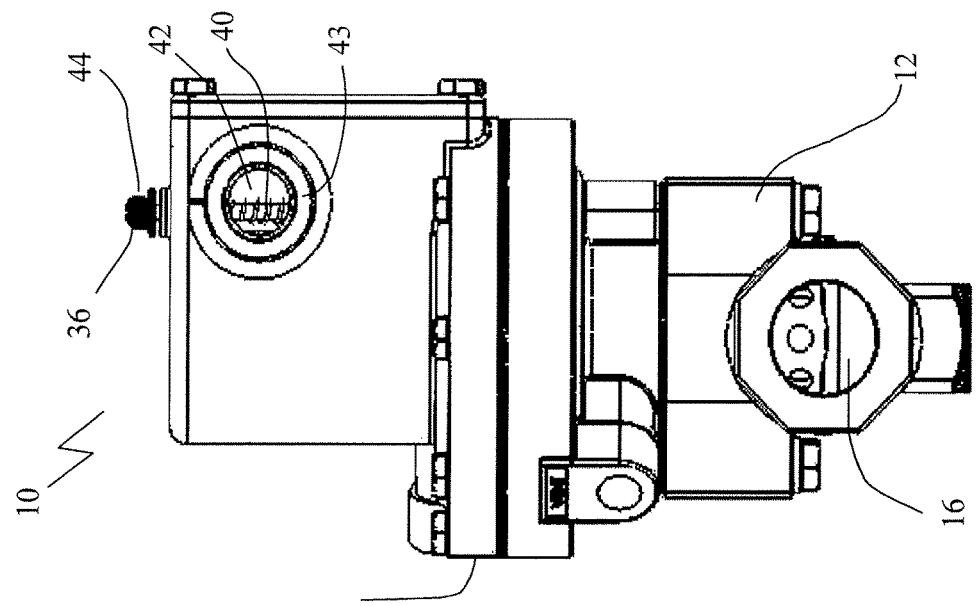
FIG. 1 is a side elevation view of a fluid valve with proof of closure.

A valve with proof of closure, generally identified by reference numeral 10, will now be described with reference to FIG. 1 through 6.

Figure 2:
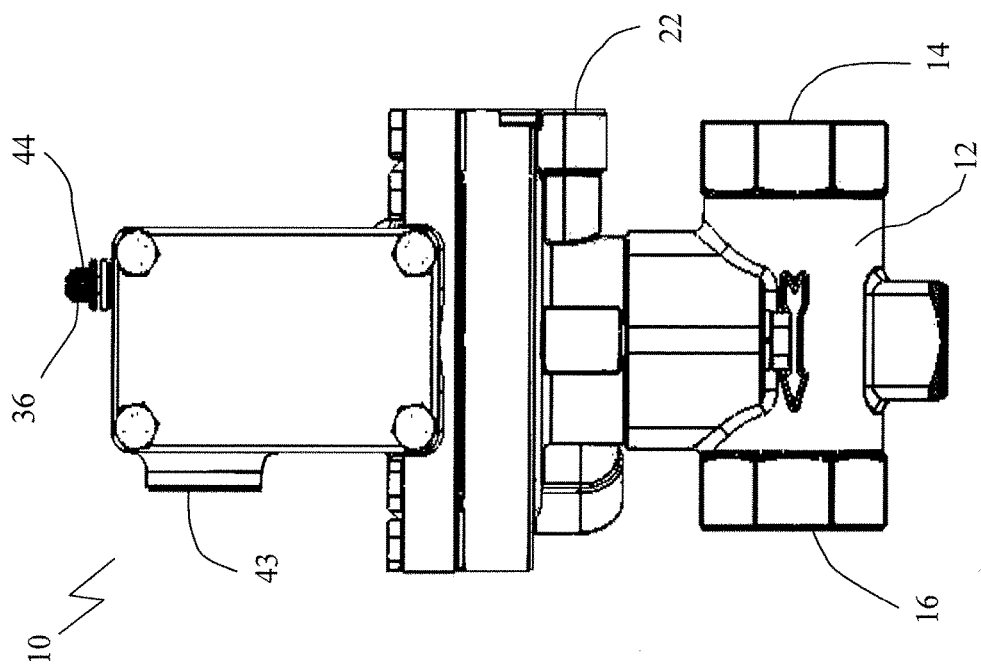
FIG. 2 is a front elevation view of a fluid valve with proof of closure.
Figure 4:
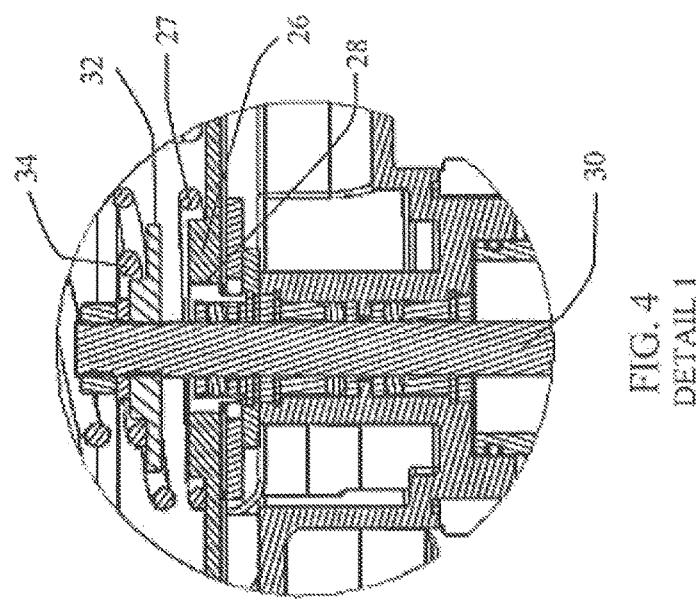
FIG. 4 is a detailed elevation view of the control portion of the fluid valve.
Figure 3:
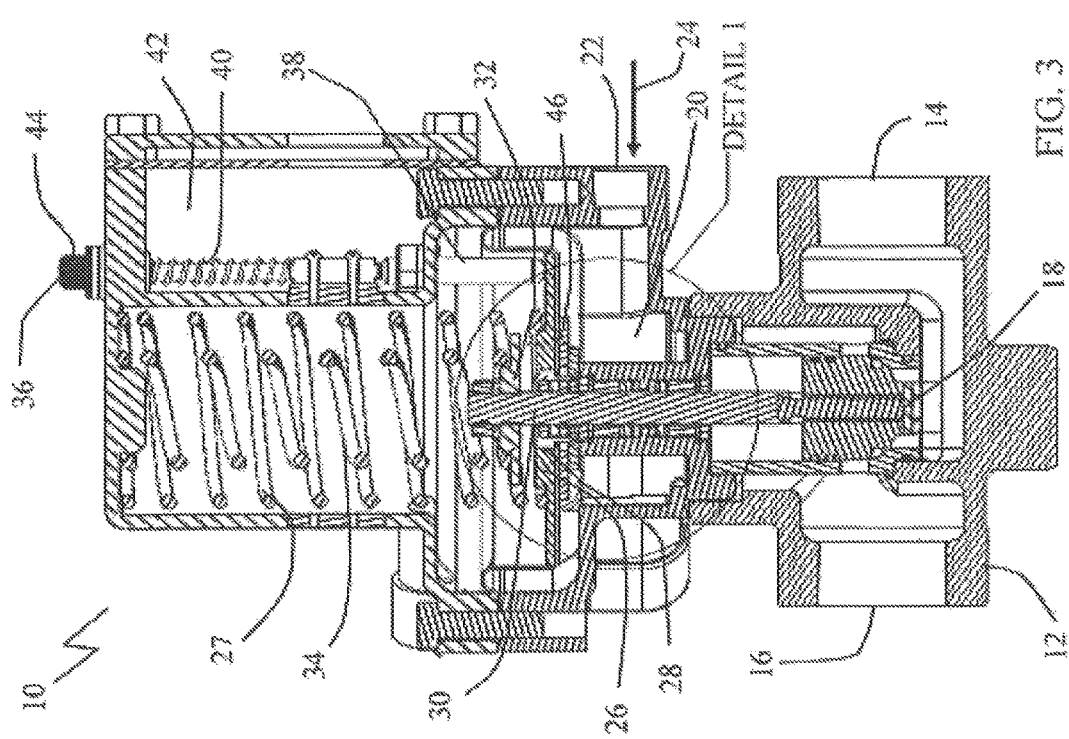
FIG. 3 is a front elevation view in section of the fluid valve with proof of closure.

Referring to FIGS. 1 and 2, valve with proof of closure 10 has valve body 12 comprising a first port 14 and a second port 16. Referring to FIG. 3, first and second ports 14 and 16 are separated by a valve member 18 that is biased toward a closed position. There is also a pressure chamber 20 that has a pressurized fluid port 22 for connecting to a source of pressurized fluid, represented by arrow 24. A piston 26 is mounted within pressure chamber 20. Piston 26 is biased toward a retracted position as shown in FIGS. 3 and 4 by a spring 27, but moves to an extended position in response to pressurized fluid entering through pressurized fluid port 22 as shown in FIGS. 5 and 6. As can be seen, piston 26 is preferably a free-floating piston, and is in the shape of a disk. Piston 26 has an aperture 28 that a shaft 30 passes through. Shaft 30 rigidly connects valve member 18 to a control member 32. Control member 32, and therefore valve member 18, is biased to the closed position by a spring 34. As depicted, spring 34 is located coaxially within spring 27. Referring to FIG. 5, as piston 26 moves toward the extended position, it engages control member 32. At this point the pressurized fluid that causes piston 26 to move must act against spring 27 as well as spring 34 in order to continue the movement of piston 26 toward an open position. In the open position, referring to FIG. 6, valve member 18 permits the flow of fluid between first port 14 and second port 16. Valve 10 as shown in FIGS. 1 and 2 includes an arrow that depicts the intended direction of flow between first and second ports 14 and 16, although it will be understood that this may be modified according to the preferences of the user and the demands of the situation. As depicted, control member 32 is a disk or plate that is attached to the top of shaft 30, and piston 26 is also a plate that is placed around shaft 30, such that it floats freely relative to control member 32.

In order to ensure that valve 10 is closed when it is intended to be closed, valve 10 also includes a valve position indicator 36 that, as shown, extends out the top of valve body 12. Valve position indicator 36 has a closed state shown in FIG. 4 and an open state shown in FIG. 6. As depicted, valve position indicator 36 is a shaft 38 that is engaged by piston 26 and is mechanically moved axially against spring 40 that biases valve position indicator 36 toward the closed state. Valve position indicator 36 is shown to pass through a separate compartment 42 compared to piston 26 and springs 27 and 34. Referring to FIGS. 1 and 2, a view port 43 allows a user to visually inspect valve position indicator 36 from outside valve body 12. Preferably, valve position indicator 36 includes a visually distinctive cap 44 so operators can easily tell whether it is in the closed state or the open state. Valve position indicator 36 may also take different forms, and may include an LED light that turns on and off for the open and closed states. Referring to FIG. 6, the switching mechanism is mechanical and is actuated by the movement of piston 26, although it is separate and distinct from piston 26. In an alternative design, valve position indicator 36 may be tied directly to piston 26. However, this is not the preferred design. As shown, valve position indicator 36 is actuated by piston 26 as it moves between the retracted position shown in FIG. 4 and the extended position shown in FIG. 5. The actuation of valve position indicator 36 begins prior to piston 26 engaging control member 32, or in other words, piston 26 engages valve position indicator 36 at a distance that is less than the distance traveled to engage control member 32. Preferably, valve position indicator 36 is in contact with piston 26 in the closed position, such that the closed state corresponds with piston 26 being in the closed position.

Referring to FIG. 4, there is also a lower control member 46 that is attached to shaft 30 below piston 26. As piston 26 moves from the extended, or open, position to the retracted, or closed, position it will engage lower control member 46 if valve member 18 does not immediately move to the closed position. In this case, either piston 26 will apply an additional force to close valve member 18 via lower control member 46, or it will not close, in which case piston 26 will be held in an intermediate position. In this situation, valve position indicator 36 will not be permitted to return to the closed state, and will be shown to be in an open state until valve member 18 properly closes. As can be seen, lower control member 46 ensures that, when valve member 18 is open, valve position indicator 36 properly depicts the open state of valve member 18 by not permitting piston 26 to move to the retracted position.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set forth in the examples, but should be given the broadest interpretation consistent with the description as a whole.

What is claimed is:

1. A valve with proof of closure, the valve comprising: a valve body comprising a first port and a second port separated by a valve member that is biased toward a closed position;
   a pressure chamber having a pressurized fluid port for connecting to a source of pressurized fluid;
   a piston mounted within the pressure chamber;
   a control member attached to the valve member;
   wherein:
   the piston biased toward a retracted position, where the piston is disengaged from the control member, and the piston moving to an extended position where the piston engages the control member, in response to pressurized fluid entering through the pressurized fluid port;
   the piston in the retracted position being spaced a first distance from the control member, the piston is moved the first distance in a first direction from the retracted position toward the extended position such that the piston engages the control member after the piston has moved the first distance; and
   further movement of the piston in the first direction moves the valve body from the closed position toward an open position;
   a valve position indicator having a closed state and an open state, the valve position indicator being biased toward the closed state, the valve position indicator being actuated by the piston as the piston is moved a second distance in the first direction from the retracted position toward the extended position to move the valve position indicator from the closed state toward the open state, and the second distance being less than or equal to the first distance.

2. The valve with proof of closure of claim 1, wherein the valve position indicator comprises a shaft that moves axially when engaged by the piston.

3. The valve with proof of closure of claim 1, wherein the control member comprises a first plate attached to the valve member by a shaft, the piston comprising a second plate mounted between the valve member and the control member.

4. The valve with proof of closure of claim 3, wherein each of the control member and the piston are independently biased toward a retracted position by springs.

5. The valve with proof of closure of claim 1, further comprising a lower control member attached to the valve member and disposed opposite the piston relative to the control member, and the lower control member preventing the piston from returning to the retracted position until the valve member is in the closed position.

* * * * *